Sept. 5, 1939.  D. W. RANTINE  2,171,992
MIXING VALVE
Filed Feb. 16, 1939
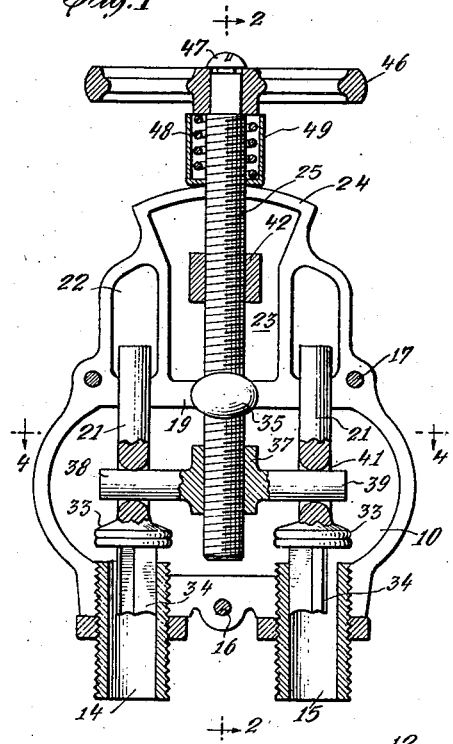
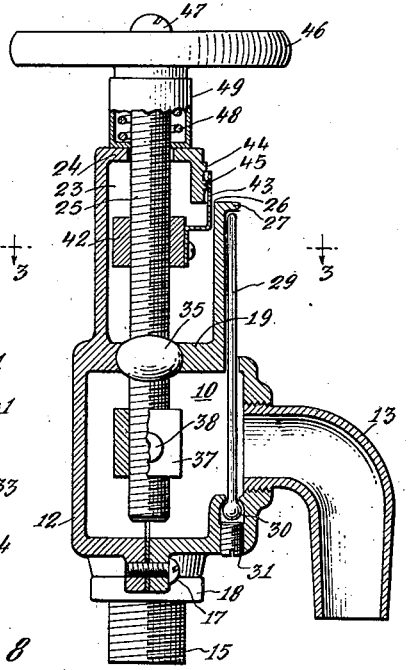
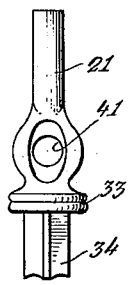
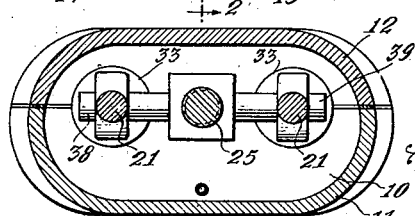
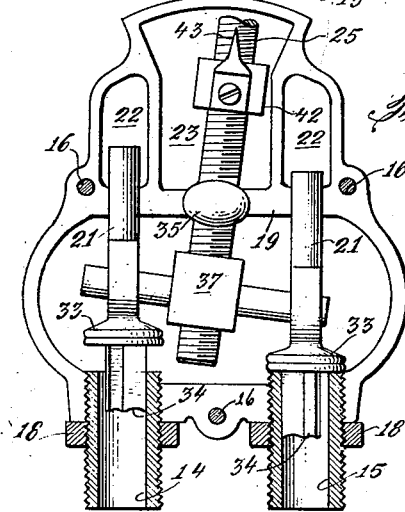
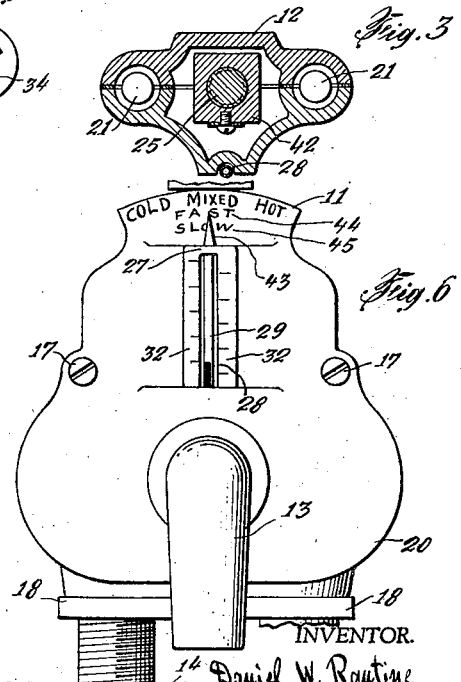
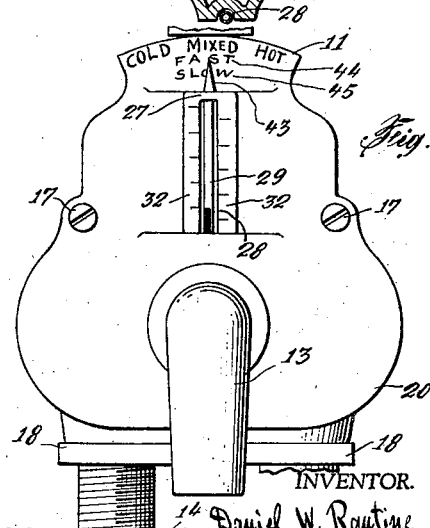
INVENTOR.
Daniel W. Rantine
BY Benjamin Webster
ATTORNEY.

Patented Sept. 5, 1939

2,171,992

UNITED STATES PATENT OFFICE 2,171,992

MIXING VALVE

Daniel W. Rantine, Brooklyn, N. Y.

Application February 16, 1939, Serial No. 256,634

1 Claim. (Cl. 277—18)

The invention relates to valves, or faucets, for mixing liquids and has for its main object to provide a valve or faucet in which two different liquids can be mixed in any proportion, so that hot and cold liquids can be mixed to required temperatures, and this application is a continuation in part of my co-pending application Ser. No. 216,420, filed June 29, 1938. Another object is to construct the valves so that either one of the liquids may be dispensed alone. A further object is to construct the valve and parts in a manner that no leakage or disturbance will occur in operation, and all operations are accomplished by one handle. Further objects are to provide an indicator of the rate of flow of the water from the faucet and means for indicating the temperature of the water. Other objects will appear in the following description and the accompanying drawing in which:

Fig. 1 is a cross-sectional elevation with both valves open.

Fig. 2 is a cross-sectional elevation on the line 2—2 of Fig. 1.

Fig. 3 is a cross-section on the line 3—3 of Fig. 2.

Fig. 4 is a cross-section on the line 4—4 of Fig. 1.

Fig. 5 is a view similar to Fig. 1, but showing the waterflow indicator.

Fig. 6 is a front view.

Fig. 7 is a detail of one of the valve stems.

Fig. 8 is a bottom view of one of the valve stems.

As shown a housing 10 is formed of metal, or any suitable material, in two engaging hollow sections, a front section 11 and a rear section 12. Any suitable outlet 13 may be threaded into the wall of the housing 10. Two externally threaded connecting pipes, 14 for cold, and 15 for hot water, are mounted in threaded apertures in the bottom of the housing 10 and connected with suitable pipes where desired as in sinks, bath tubs, or showers. The tops of the pipes 14 and 15 provide circular valve seats as will hereinafter appear. The front of or the entire housing 10 may be covered with a thin shell 20 of ornamental design and finish and upon which suitable indicia may be placed. Three triangularly disposed screwholes 16 in each section 11 and 12 and related apertures in the covering shell 20 receive fastening screws 17 which tightly bind the parts together. Gaskets, cement, or any suitable material may be interposed to prevent water leakage. Fastening and sealing nuts 18 may be threaded on the pipes 14, 15, against the bottom of the housing 10.

A transverse wall 19 forms the top sealing closure of the water chamber and has two vertical apertures, concentric with the pipes 14, 15 in which valve stems 21 reciprocate upwardly into chambers 22 formed in the housing 10 above the wall 19. A central transversely extending chamber 23 is formed between the chambers 22 in the housing 10, and is covered with an arcuate top 24 which is centrally slotted to permit the rocking from side to side of an externally threaded operating shaft 25 to control the temperature of water flowing through the outlet 13.

The upper wall of the front section 11 has a step formation 27 to provide an arcuate vertical slot 26. The shell 20 is similarly formed.

The front wall has a vertical recess 28 in which is mounted the upper part of a mercury thermometer 29, the stem of which passes through the front of the top 19 and down into the water chamber behind the outlet 13 so that the temperature of the outflowing water is recorded. A concentric aperture in the lower wall of the housing opens into a recess 30 suitable for the bulb of the thermometer and a screw 31 closes the recess at the bottom. The thermometer 29 is cemented or otherwise sealed in the housing 10 to prevent water leakage. Fahrenheit or other indicia 32 may be placed on the front of the shell 20 aside the exposed thermometer 29 for facile reading of the temperature of the outflowing water.

The stems 21 support at the bottom suitable valves 33 which seat on the pipes 14 and 15 in their lowered positions to selectively close the water inlets, or to vary the valve openings. Mounted centrally on the bottom of each valve is a guide 34 formed with three vertical fins concentrically disposed and formed to exactly center the valves 33 on their seats and slidable in the pipes 14, 15. Fixed on the shaft 25 below the middle is a ball 35 which sealingly engages a seat 36 formed around a central opening in the wall 19, and on which it is rockable with the shaft 25. A yoke 37 is screwed on the bottom of the shaft 25, is vertically adjustable on the threads of the shaft 25 by rotating the shaft at the top to raise or to lower the valves 33, and supports on either side laterally extending arms 38, 39, which pass thru holes 41 in stems 21 and are rockable vertically therein to raise or lower the stems, respectively.

The indicator for the rate of flow of the water will now be described. A cubical collar 42 mounted on the shaft 25 is held against rotation by the inner wall of the housing 10 but the shaft 25 is in threaded engagement with a vertical central aperture in the collar 42, so that rotation of the shaft 25 raises or lowers the collar 42. An indicating pointer 43 is mounted on the front wall of the collar 42, passes up through the slot 26 and raises to overlie indicia on the front of the shell 20 at 44, "Fast", when the valves 33 are raised to cause a rapid flow, or at 45, "Slow", when the valves 33 are lowered to cause a slow flow from the outlet 13.

A handle 46 is fixed against rotation on top of the shaft 25 by a screw 47. A coil spring 48 surrounds the top of the shaft 25 and engages at the top the bottom of the hub of the handle 46 and at the bottom the top arcuate wall 24 on both sides of the intermediate slot in which the shaft 25 is rockable, and acts to yieldably secure the shaft 25 in any adjusted position. A protective and ornamental collar 49 may surround the spring 48.

On the front wall of the shell 20 are placed suitable indicia such as "Cold", "Mixed", and "Hot" in front of which the shaft 25 lies when the outflowing water is in the condition indicated.

It is now apparent that the improved mixing valve mixes hot and cold water at varying temperature by the facile rocking of a handle to and fro, that is easily adjustable to regulate the rate of flow of the water, that also indicates the rate of flow of the water, and further that indicates the temperature of the water at the outlet.

Having shown and described one embodiment of my invention, I realize that in view of my disclosure many changes, substitutions, or omissions of parts will readily occur to those skilled in the art, but within the spirit and scope of my invention and I do not limit myself to the details of the disclosure.

I claim:

In a mixing valve for two liquids, in combination, a mixing chamber, two inlets into said chamber, movable closures for said inlets, an outlet, means for simultaneously operating said closures to various open positions respectively, means for adjusting the operative position of said closures simultaneously comprising an operating shaft, rockable to and fro and lateral arms supporting the closures and mounted on the shaft, said shaft being adjustable with respect to said arms, means for adjusting the arms on the shaft to vary the operative position of the closures, a block having a screw-threaded adjustment on the shaft but non-rotatable in the valve body, and a finger mounted on the block, extending outside the valve body, rockable to and fro with the shaft and adjustable up and down on the shaft with the inlet closures to indicate the rate of water flow.

DANIEL W. RANTINE.